United States Patent [19]
Barton et al.

[11] 4,205,357
[45] May 27, 1980

[54] DISK DRIVE UNIT INCORPORATING A FIELD-REPLACEABLE FIXED DISK ASSEMBLY

[75] Inventors: Richard E. Barton, Scituate, Mass.; Jack V. Fultz, Thousand Oaks, Calif.; Yoshiyasu Narahara, Westlake Village, Calif.; Michael S. Shebanow, Chatsworth, Calif.

[73] Assignee: Pertec Computer Corporation, Los Angeles, Calif.

[21] Appl. No.: 915,787

[22] Filed: Jun. 15, 1978

[51] Int. Cl.² ............................................. G11B 17/02
[52] U.S. Cl. ...................................... 360/135; 360/98
[58] Field of Search ............................. 360/97–99, 360/133, 135; 346/137; 274/10 S, 39 A, 9R

[56] References Cited
U.S. PATENT DOCUMENTS 3,938,192  2/1976  Caletti .................................. 360/133

Primary Examiner—Robert S. Tupper
Attorney, Agent, or Firm—Freilich, Hornbaker, Wasserman, Rosen & Fernandez

[57] ABSTRACT

A disk assembly which is normally fixed on a disk drive, but which can be removed in the field from the disk drive spindle and replaced on the spindle with extreme precision so that pre-recorded tracks are concentric with the axis of the spindle within extremely small tolerances. The disk assembly includes a mounting ring which fits around the drive spindle, the ring having three resilient centering flexures extending slightly radially inwardly of the rest of the ring to engage the drive spindle, and all being outwardly deflected substantially the same amount to center the ring on the spindle.

9 Claims, 8 Drawing Figures

4,205,357

DISK DRIVE UNIT INCORPORATING A FIELD-REPLACEABLE FIXED DISK ASSEMBLY

BACKGROUND OF THE INVENTION

This invention relates generally to magnetic disk drive units and more particularly to such drive units for accommodating both a user-removable disk pack and a field-replaceable fixed disk assembly.

Many different models of magnetic disk drive units are known in the art. Several of these models accommodate a removable disk pack, which contains one or more magnetic disks mounted on a common hub, for example of the IBM 3336 type. This type of disk pack is intended for ready interchange between different drive units and is typically used to store large data bases which are generally also recorded on some other medium such as a back-up magnetic tape. Such disk packs usually dedicate one disk surface for storage of servo track information. That is, the dedicated disk servo surface has track information recorded thereon at the factory by a precision track writing device. In use, a read/write head positioner within the drive unit responds to error information derived from the servo surface head to precisely position that head adjacent a servo track. The drive unit contains a plurality of read/write heads, each uniquely associated with a different disk surface, which heads are physically connected to the servo track head so that the positioning of the servo track head correspondingly positions the other heads.

Some disk drive models also contain one or more nonremovable of fixed disks in addition to accommodating a removable disk pack. The fixed disks are installed by the drive unit manufacturer and are neither removable by a user operator nor field replaceable by a service technician. The reason that the fixed disks are not field replaceable is that great precision is required to assure retention of concentricity between prerecorded servo tracks and the center of rotation of the drive unit drive spindle. Due to the precision required, it has been necessary to return the entire drive unit to the manufacturer or some suitable service facility having a precision track writing capability in order to replace fixed disks.

SUMMARY OF THE INVENTION

The present invention is directed to an improved disk drive unit for accommodating both (1) user-removable and (2) non-user-removable but field-replaceable disk assemblies on a common drive spindle.

In the preferred embodiment of the invention, the user-removable disk assembly will be assumed to be an IBM 3336 or equivalent and will generally be referred to herein as the "disk pack." However, it should be understood that the invention is equally applicable to disk drive units accommodating other user removable disk assemblies such as single disk cartridges. The non-user-removable but field-replaceable disk assembly will generally be referred to herein as the "fixed disk assembly."

The fixed disk assembly includes a mounting ring which carries at least one data storage disk and is designed to mount closely around the drive unit drive spindle. The mounting ring includes at least three flexure members spaced annularly around the ring, either being attached thereto or formed integral therewith. The flexure members define axially-extending surfaces which, in use, contact the spindle and center the ring thereon. When the ring is mounted on the spindle, the flexure members are deflected radially outwardly by the spindle to form a controlled interference fit therewith.

The preferred mounting ring embodiment has three U-shaped grooves formed therein, each extending axially into the ring. Each groove thus forms an axially-extending cantilevered beam which serves as the flexure member. The cantilevered beams are deformed radially inwardly with respect to the inner annular ring surface and when the mounting ring is placed over the drive spindle, the cantilevered beams engage the axial surface of the drive spindle to deflect the cantilevered beams outwardly to thus center the mounting ring with high precision on the drive spindle. In the preferred embodiment, the drive spindle has a ledge for supporting the mounting ring thereon. Additionally, an annular groove is formed in the drive spindle for receiving therein leaf spring retainers secured to the mounting ring which presses the mounting ring firmly against the ledge.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
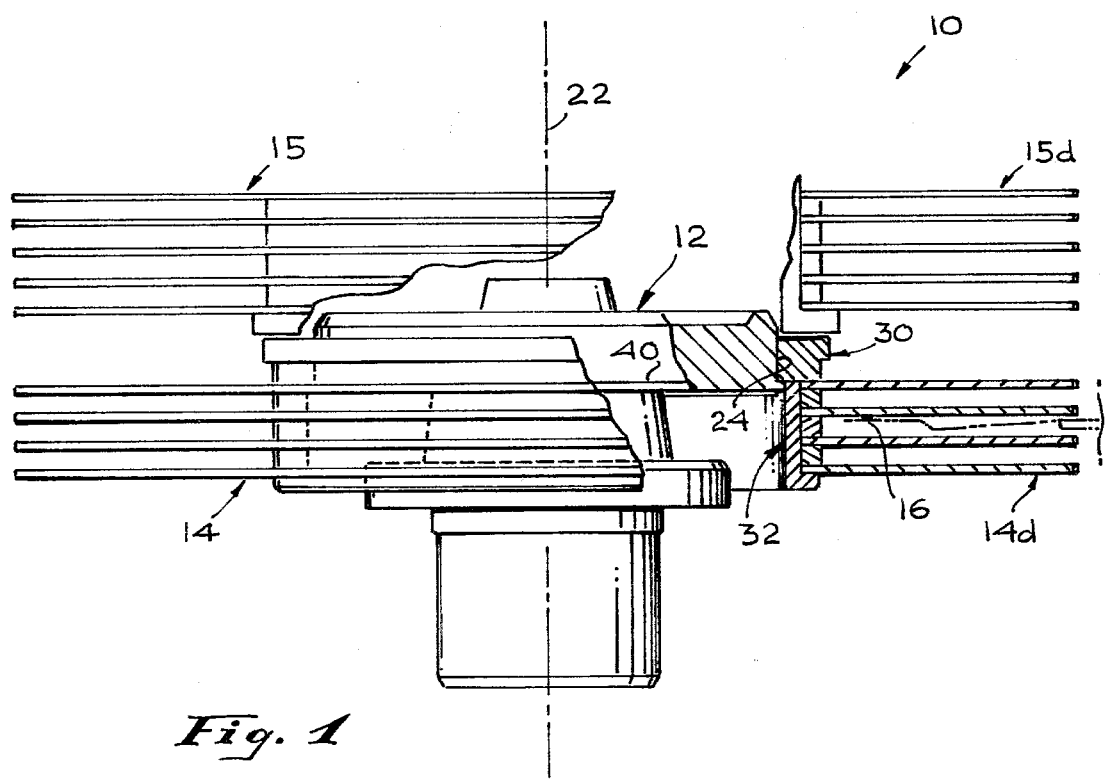
FIG. 1 is a sectional side view of a disk drive unit, in accordance with the present invention, showing portions of the drive spindle, fixed disk assembly, and disk pack.

FIG. 1 illustrates a portion of a disk drive unit 10 constructed in accordance with the present invention which includes a rotatable drive spindle 12, a fixed disk assembly 14 and a removable disk pack assembly 15. The assemblies 14 and 15 are each comprised of a plurality of disks 14d and 15d, respectively, each disk having at least one magnetic recording surface thereon. The disk assemblies 14, 15 are designed for mounting on the spindle 12 so that the disks rotate as the spindle rotates to thus move successive sectors on each disk surface past a read/write head 16 uniquely associated with that surface. Each read/write head 16 is mounted on a positioner assembly (not shown) for radial movement with respect to the disk surface to thus enable the head to be selectively positioned over any one of a plurality of annular tracks.

The removable disk pack assembly 15 preferably comprises a disk pack of the IBM 3336 type which is well-known in the art and which is readily interchangeable between disk drive units of several different manufacturers. The removable disk pack assembly 15 is intended to be readily replaceable by a user operator and is typically used to store relatively large data bases which are generally also recorded on some other media such as a back-up magnetic tape. On the other hand, the fixed disk assembly 14 is utilized to store more critical information whose loss could considerably jeopardize the operation of an enterprise. Data stored on the removable disk pack is less secure than data recorded on the fixed disk assembly, since the disk pack is subject to operator misuse, physical damage, more extreme temperature environments, etc.

In prior art disk drive units employing both removable disk packs and fixed disks, it has been common practice to mount the fixed disks securely to the drive spindle at the factory where a precision track writer was used to write servo tracks on the disk. In initially writing the servo tracks on the disk, it is important to precisely position the tracks concentrically with respect to the axis of rotation of the drive spindle. By permanently mounting the fixed disks on the drive spindle at the factory, high precision can be maintained such that very close concentricity can be achieved.

Although it is intended that the fixed disks not be removed from the drive spindle in normal use, it sometimes happens that a fixed disk becomes damaged, as for example due to head crash. In such cases, it is of course necessary to remove and replace the fixed disk. As has been mentioned, it has heretofore been impractical to do this in the field because of the difficulty encountered in mounting the fixed disks on the drive spindle with sufficient precision. For example, in high-density recording systems, the fixed disks must be mounted on the drive spindle with a concentricity precision on the order of 20 microinches for a spindle having an outer diameter of about 6 inches. Thus, it has been typical in such prior art disk drive units to require that the entire drive unit be returned to the factory in order to remove and replace a fixed disk assembly.

In accordance with the present invention, the fixed disk assembly 14 is constructed so that it can be replaced in the field, with sufficiently high precision that it is substantially concentric with the axis 22 of the drive spindle, such as with a run-out of less than 20 microinches, so that the servo tracks previously written on the disks of the disk assembly can be utilized. The fixed disk assembly 14 includes a mounting ring 30 which can mount closely about the exterior axial cylindrical surface 24 of the spindle 12 and a coupling 32 which connects the disks 14d to the mounting ring 30.

Prior to considering the structural details of the fixed disk assembly 14, it is pointed out that the spindle assembly 12 is substantially conventional and quite similar to other disk drive unit spindles for driving an IBM 3336 disk pack 15. However, the spindle assembly 12 in accordance with the invention differs from such prior spindle assemblies in that the exterior cylindrical spindle surface 24 has been modified to serve as a reference surface to precisely concentrically position the fixed disk assembly, as will be described in further detail hereinafter. It should be understood, however, that the modification of the spindle surface 24 for this purpose does not interfere with the spindle assembly functioning in a conventional manner to accommodate the removable disk pack 15.

Figure 2:
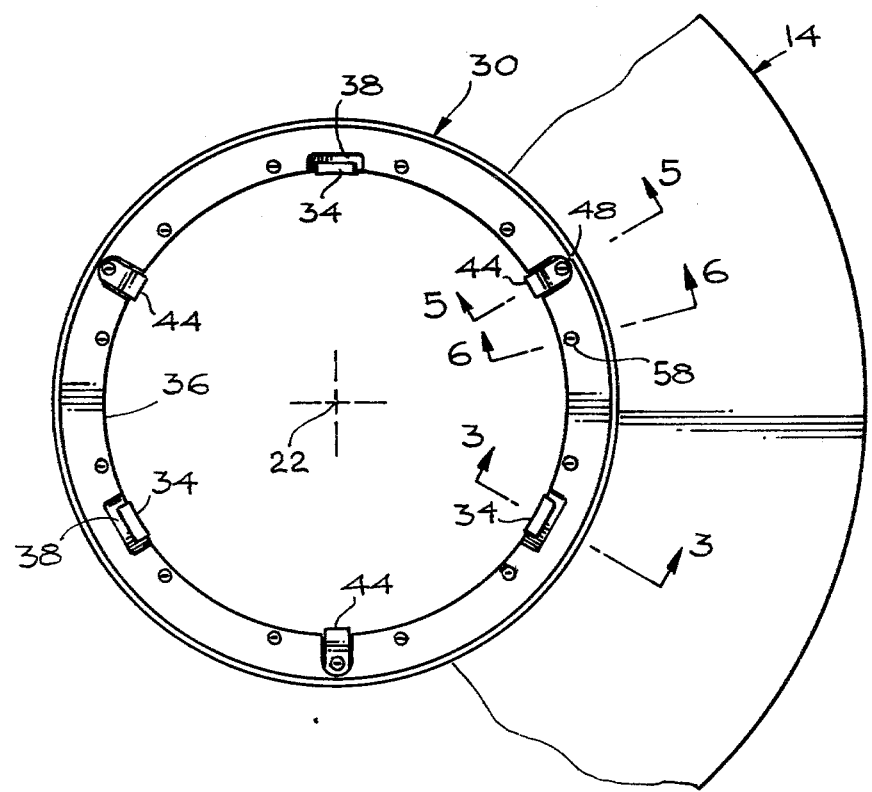
FIG. 2 is a partial plan view of the fixed disk assembly of FIG. 1.
Figure 3:
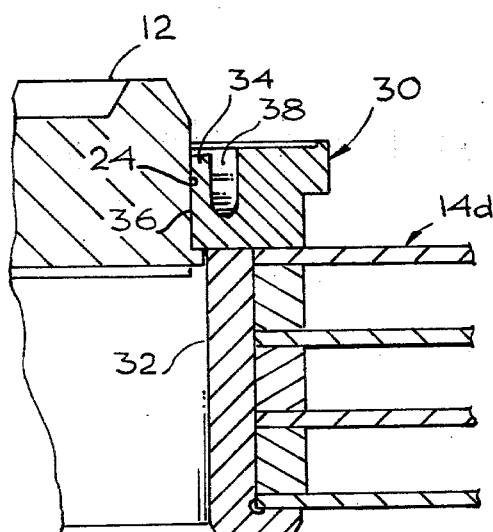
FIG. 3 is a view taken on the line 3—3 of FIG. 2, showing the disk mounted on a drive spindle.
Figure 4:
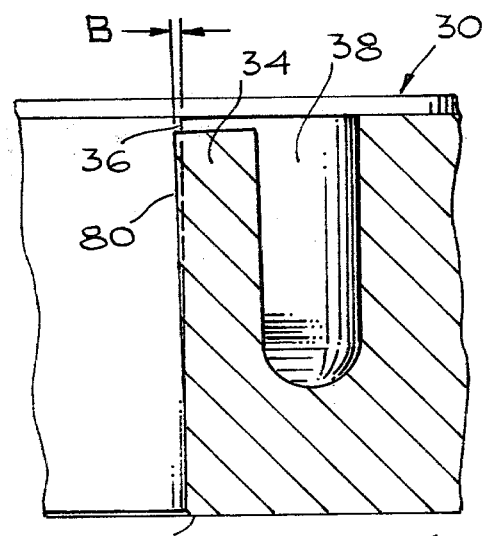
FIG. 4 is an enlarged view of a portion of a fixed disk assembly of FIG. 3.

As shown in FIGS. 2–4, the mounting ring 30 includes three flexure members 34 circumferentially spaced around the ring. The mounting ring has an inner cylindrical surface 36 of a certain diameter and the flexure members 34 extend radially inwardly from this surface 36. Each of the flexure members 34 is formed by milling a U-shaped groove 38 in the ring 30. Each groove 38 extends from the radially inner surface 36 of the ring in a U-shaped loop to thus form an axially-extending cantilevered beam comprising a flexure member 34. As shown in FIG. 4, the cantilevered beam or flexure member 34 is then deformed radially inwardly so that when undeflected it lies a small distance B radially inwardly with respect to the adjacent portions of the ring inner surface 36 or, more accurately, with respect to a circle on which the inner surface 36 lies. As a result, when the mounting ring 30 is pressed over the spindle 12, the flexure members 34 bend radially outwardly to provide an interference fit with the drive spindle, but with the flexure members 34 being resilient enough to enable assembly without a large amount of downward force that might cause damage to it or the spindle surface.

Figure 5:
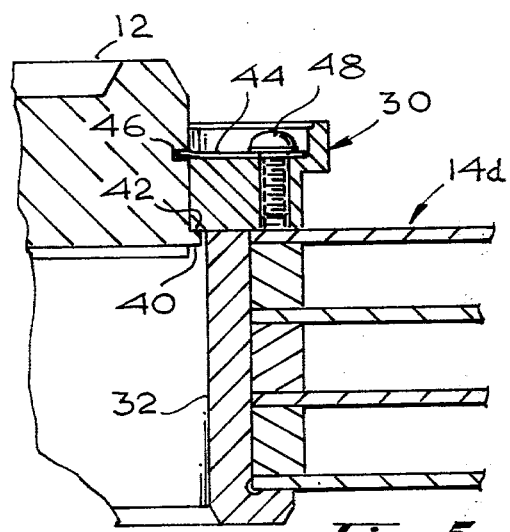
FIG. 5 is a view taken on the line 5—5 of FIG. 2, showing the fixed disk assembly portion mounted on a drive spindle.

As shown in FIG. 5, the drive spindle 12 is formed with a ledge 40 which can support a lower edge 42 formed on the mounting ring 30. In order to hold the mounting ring against the ledge, the ring is provided with three leaf springs 44, which extend into a groove 46 formed in the periphery of the drive spindle. The leaf springs 44 press against the top of the groove 46 to urge the mounting ring downwardly against the ledge 40 on the spindle. Each leaf spring can be held in place by a screw 48 that screws into a threaded hole formed in the mounting ring.

Figure 6:
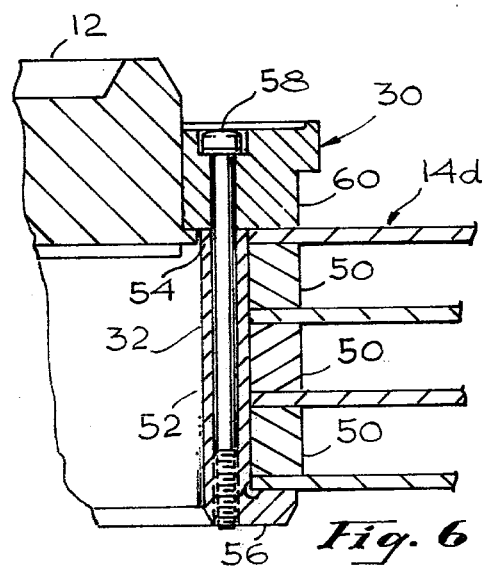
FIG. 6 is a view taken on the line 6—6 of FIG. 2, showing a portion of the fixed disk assembly mounted on a drive spindle.
Figure 7:
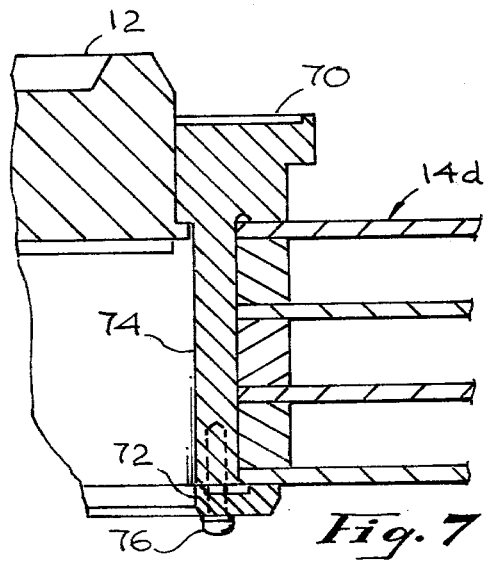
FIG. 7 is a partial sectional view of a fixed disk assembly constructed in accordance with another embodiment of the invention.

FIG. 6 illustrates details of the coupling 32 that holds the disks 14d to the mounting ring 30. The coupling 32 includes a group of three spacer rings 50 located between each pair of adjacent disks 14d to separate them, and a cylinder member 52 lying radially within the disks. The cylinder member 52 has an upper end 54 lying against the bottom of the mounting ring 30 and a lower end 56 extending radially outwardly to lie under the disks 14d. A threaded fastener 58 connects the mounting ring 30 to the cylinder member 52 so that the disks 14d and the spacers 50 therebetween are clamped between the lower end 56 of the cylinder member which lies under the disks and a radially outer portion 60 of the mounting ring which lies over the disks. FIG. 7 illustrates another mounting ring 70 and coupling 72, wherein the mounting ring has a cylindrical portion 74 lying within the disks, and the coupling 72 can be fastened by a short screw 76 to the cylindrical portion 74 of the mounting ring. It should be recognized of course that it may be desirable to recess the head of screw 76 within the coupling 72.

As mentioned above, the flexure members 34 are relied upon to center the fixed disk assembly 14 on the drive spindle 12, so that any servo tracks previously written on the disks 14d on the disk assembly will be concentric with the axis 22 of the drive spindle. The drive spindle is constructed with its mounting surface 24 (FIG. 1) accurately ground concentric with the axis of rotation 22 of the spindle. This can be accomplished by performing a final grinding operation of the spindle surface 24 after it has been assembled, by rotating it on its own bearings while it is mounted in a suitable grinder.

Although the mounting ring is constructed with high precision, it is not necessary that the radially inner surface 80 (FIG. 4) at the top of each flexure member 34 be positioned with extreme accuracy. All that is required is that when the three flexure members 34 engage a drive spindle surface 24 of predetermined diameter, the flexure members always position the disks 14d in the same position with respect to the spindle surface 24. If the spindle surface 24 for the disk drive unit 10 and for the track writer at the factory (or an adaptor for the track writer) are of precisely the same diameter, then the spring rate of the flexure members 34, i.e., the amount of radially outward deflection for a predetermined loading, would not affect the repeatability of the mounting ring position. However, where the outside diameter of the drive spindle surface 24 is different from that of the track writer at the factory, then each three flexure members 34 must have approximately the same spring rate. With all flexure members having the same spring rate, then a drive spindle which is oversized will not cause the axis of the mounting ring to be shifted. In one mounting ring in accordance with the invention, each flexure member had a spring rate or compliance of 25 microinches per pound and was designed to receive about a 23-pound force when the ring was installed on a spindle with an axial force of about 14 pounds.

Figure 8:
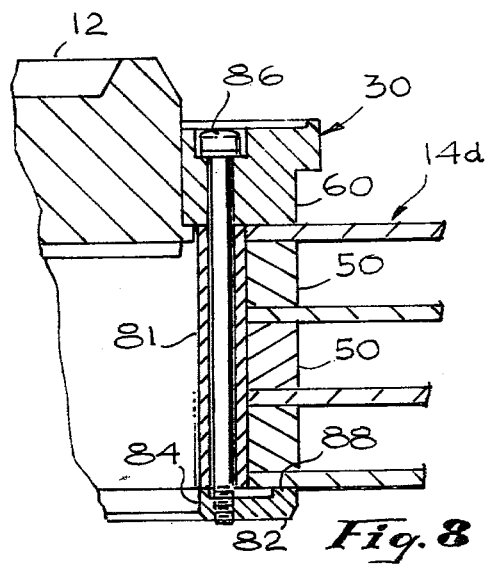
FIG. 8 is a partial sectional view of a fixed disk assembly constructed in accordance with still another embodiment of the invention.

FIG. 8 illustrates still another structural embodiment of the invention, similar to that shown in FIG. 6 but differing therefrom in that the lower end 56 extending radially outward from the cylinder member 52 is not formed integral therewith. Instead, the embodiment of FIG. 8 uses a tubular spacer member 81 and a clamping ring 82. The clamping ring 82 is provided with internally threaded apertures 84, each of which receives the threaded end of a fastener 86 which passes through the spacer member 81. The clamping ring 82 preferably has a raised outer flange 88 which is drawn against the lower surface of the bottom disk in the assembly 14. As shown in both FIGS. 6 and 8, spacers 50 are provided between the disks. The radially outwardly extending portion 60 of mounting ring 30 bears against the upper surface of the top disk in the assembly 14. Thus, as the fastener 86 is threaded into apertures 84 in clamping ring 82, the clamping ring 82 and mounting ring 30 are drawn toward one another to clamp the disks 14d and spacers 50 therebetween.

Thus, the invention provides a fixed disk assembly which can be replaced in the field on a disk drive spindle while maintaining high concentricity of prerecorded servo tracks of the disk assembly with the axis of rotation of the drive spindle. This is accomplished by utilizing a fixed disk assembly with a mounting ring having a plurality of flexure members spaced around the ring that extend radially inwardly from most of the rest of the mounting ring to contact the spindle, and with the flexure members being deflectable radially outwardly by the spindle to form a controlled interference fit therewith. Although the flexure members can be formed integral with the mounting ring by cutting grooves in the mounting ring and deformably bending the resulting cantilevered beams radially inwardly, it should also be recognized that the flexure members can be formed separately from the mounting ring, either of the same or different material, and then secured to the mounting ring by an appropriate fastening means. The drive spindle is preferably provided with a ledge, and the mounting ring is set on the ledge and held firmly thereon by a plurality of leaf springs which are secured to the mounting ring and project into a groove formed in the drive spindle.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A disk assembly for mounting on a disk drive spindle, comprising:

a mounting ring for mounting closely around the drive spindle, said mounting ring defining a central opening to permit said drive spindle to pass therethrough;

at least one data storage disk; and a coupling connecting said at least one data storage disk to said mounting ring;

said mounting ring including a plurality of flexure members spaced around the ring and extending radially inwardly from most of the rest of the mounting ring to contact the spindle, said flexure members being positioned to define an opening slightly smaller than the diameter of the drive spindle and being deflectable radially outwardly by the spindle to form a controlled interference fit therewith, said flexure members exhibiting substantially the same spring rate of radially outward deflection.

2. The assembly described in claim 1 wherein:

said mounting ring has three grooves spaced thereabout, each groove extending into the radially inner surface of the ring in a loop to form a cantilevered beam forming one of said flexure members, and each of said flexure members is deformed radially inwardly from the adjacent portions of said inner surface so its free end when undeflected lies radially inward of adjacent inner surface portions of the ring.

3. The assembly described in claim 1 wherein the disk drive spindle has a ledge and a groove above the ledge and wherein:

said mounting ring has a lower surface for resting on said ledge and includes a plurality of leaf springs extending radially inwardly from most of the rest of the ring to enter the spindle groove and press up against the upper wall of the groove to hold the lower ring surface firmly seated on the ledge.

4. The assembly described in claim 1 wherein:

said at least one disk includes a stack comprised of a plurality of concentric disks;

said mounting ring has a radially outer portion defining a first clamping surface lying over the outer surface of the disk at one end of said stack; and said coupling includes a plurality of spacer rings lying between said disks and a clamping member defining a second clamping surface lying over the outer surface of the disk at a second end of said stack, and fastener means for drawing said mounting ring and clamping member toward one another to clamp said disks and spacers between them.

5. The assembly described in claim 1 wherein:

said at least one disk includes a plurality of disks;

said mounting ring includes an upper portion lying over said disks and a cylinder portion depending from the upper portion of the ring; and said coupling includes a plurality of spacer rings lying between said disks, and a lower member having an outer portion lying under said disks and an inner end attached by fasteners to the lower end of said cylinder portion.

6. A method for forming a disk assembly for mounting on a predetermined disk drive spindle, comprising:

forming a mounting ring with a radially inner surface defining a first circle of slightly greater radius than said predetermined spindle surface;

forming at least three grooves at locations spaced about said ring, each groove formed as a loop extending from said radially inner surface of the ring to leave a cantilevered beam with its radially inner surface lying on said first circle;

uniformly bending said cantilevered beams radially inwardly so that when undeflected they define a second circle concentric with and spaced radially inwardly from said first circle; and mounting at least one data storage disk on said mounting ring.

7. In a disk drive unit having a drive spindle for accommodating a removable disk pack on one end of said spindle, a disk assembly mounted on the axial surface of said spindle, said disk assembly comprising:

a mounting ring having a central opening therein defined by an internal cylindrical surface for receiving said spindle therethrough;

a plurality of flexure members carried by said mounting ring around said internal cylindrical surface, each such flexure member having an axially-extending surface positioned radially inwardly from said internal cylindrical surface for bearing against said spindle axial surface, said flexure members exhibiting substantially the same spring rate and defining an opening slightly smaller than the diameter of said spindle and being deflectable radially-outwardly by the spindle to form a controlled interference fit therewith; and at least one data storage disk secured to said mounting ring.

8. The disk drive unit of claim 7 wherein said flexure members are formed integral with said mounting ring.

9. The disk drive unit of claim 8 wherein said mounting ring has a plurality of substantially U-shaped grooves, each extending axially into said mounting ring and each terminating adjacent said central opening to form an axially extending cantilevered beam, each such beam being deformed radially inwardly to form one of said flexure members.

* * * * *